Sept. 19, 1950          L. T. KNOCKE          2,522,792

CLOSURE FOR RECEPTACLES

Filed Nov. 16, 1946

INVENTOR.
Louis T. Knocke
BY Harness & Harris
ATTORNEYS.

Patented Sept. 19, 1950

2,522,792

UNITED STATES PATENT OFFICE 2,522,792

CLOSURE FOR RECEPTACLES

Louis T. Knocke, Detroit, Mich., assignor to Chrysler Corporation, Highland Park, Mich., a corporation of Delaware Application November 16, 1946, Serial No. 710,375

2 Claims. (Cl. 220—39)

This invention relates to receptacles for liquid and more particularly to improvements in the drain opening and closure therefor.

An object of the invention is the provision of a receptacle from which the liquid content thereof can be completely drained without the necessity of relatively deforming the wall containing the drain opening.

Motor vehicles include a tank for gasoline as well as an engine pan providing a lubricant receptacle, and it is desired that the content of each be completely drained therefrom. Furthermore, the drain closure should have the maximum of road clearance. Therefore, an object of the invention is to provide such receptacles with a drain opening and closure having the above desired characteristics; to provide a closure which can be readily applied and removed and having an external contour which will minimize the danger of damage or loss when unintentionally engaged with a road surface; and to provide a sealing gasket between the closure and receptacle drain opening which is completely shielded by the closure but may limit flow relative thereto under pressure therefrom.

Other objects and advantages of the invention will be more apparent from the following description taken in connection with the accompanying drawings, in which.

Figure 1:
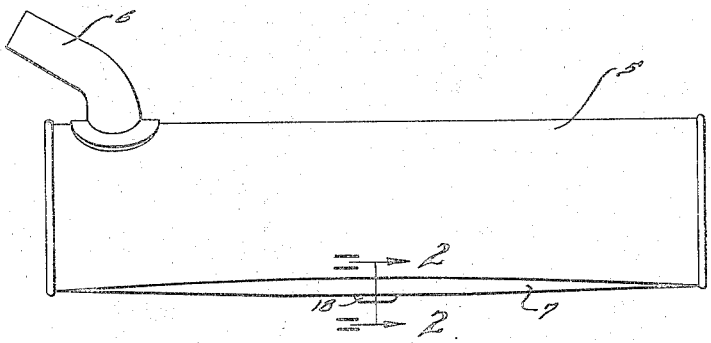
Fig. 1 is a side elevational view of a receptacle embodying the invention.
Figures 2, 3:
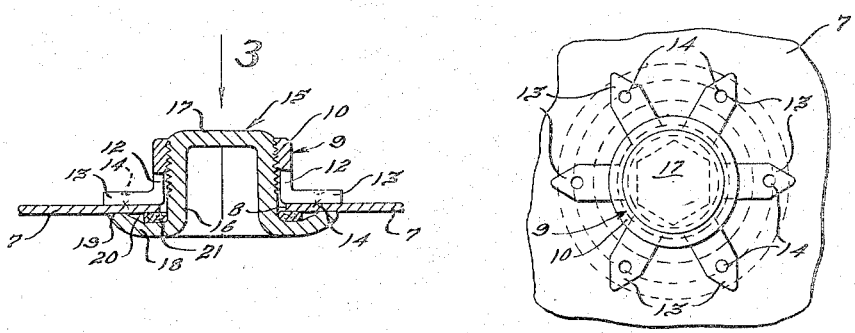
Fig. 2 is an enlarged fragmentary sectional view in elevation taken as indicated by line 2—2 of Fig. 1.
Fig. 3 is a top plan view of Fig. 2.
Figure 4:
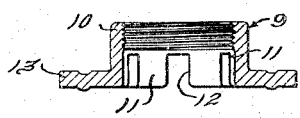
Fig. 4 is a sectional elevational view of the closure receiving nut shown in Fig. 2.

Referring to Fig. 1, the invention is illustrated in connection with a gasoline tank 5 for a motor vehicle, although the invention is not limited in its broad aspect to this particular type of receptacle. The tank 5 has the usual filler neck 6 and a bottom wall 7 in which the drain opening 8 is formed, as shown in Fig. 2, such wall being so lowered as to provide a sump for the collection of non-combustible liquid in accordance with well known practice. However, the contour of the wall 7 is not otherwise interrupted by relatively deflecting portions thereof adjacent the opening 8.

A sleeve-like nut, generally designated by the numeral 9, is positioned within the tank 5 during fabrication of the latter with the opening thereof in registration with drain opening 8. The nut 9 includes a circumferentially continuous end portion 10, the internal surface of which is threaded, and circumferentially alternate legs 11 and gaps 12 extending downwardly from such end portion. Each leg 11 is deflected radially outwardly to provide a terminal flange 13 which abuts the interior surface of the wall 7 and is secured thereto, for example by projection welding as indicated at 14. The gaps 12 terminate flush with the interior surface of the wall 7 and thus permit complete drainage of the content of the tank therethrough to the wall opening 8, it being understood that liquid flows between each pair of adjacent flanges 13 to a gap 12.

The plug, generally designated by the numeral 15, for closing the opening includes a tubular body part 16 which is projected through the drain opening 8 into the nut 9 and has an external surface in threaded engagement with the internally threaded part of the nut. The end 17 of the plug is closed and the other end thereof is open, being provided with a hexagonal internal surface, as shown in Fig. 3, to receive a suitable manipulating tool for installing and removing the plug. At this open end the plug has an annular radial flange 18 extending outwardly beyond the opening 8 to overlap the external surface of wall 7, and has a flat face 19 which abuts the latter. The flange 18 is arcuate in cross-section and has an annular recess 20 at the concave side thereof between the face 19 and body 16 in which is positioned a sealing gasket 21 which is compressed between flange 18 and wall 7 when the plug 15 is assembled as shown. While the gasket is thus shielded and retained by the plug, nevertheless the recess is sufficiently large radially relative to the gasket as to permit a limited deflection or flow of the material thereof under pressure. The external surface of flange 18 adjacent the outer edge thereof has an arcuate contour as at 22 to minimize the likelihood of the plug being damaged by contact with road surface. By removing the plug, the entire fluid content of the receptacle can be drained as the passages between flanges 13 are at the level of the inner surface of wall 7 and the openings 12 are also thereat.

I claim:

1. In a liquid receptacle including a bottom wall having a substantial area thereof extending at a uniform elevation and having a drain opening within said area, a closure for said opening including a nut within the receptacle having a body part provided with a central opening aligned with said drain opening, said body part including an internally threaded circumferentially continuous upper end portion and a lower end portion having a plurality of slots, flanges integral with and radiating outwardly from said lower portion seated on the internal surface of said wall at said area and secured thereto, adjacent flanges being circumferentially spaced apart to provide a passage therebetween for the flow of fluid in contact with the inner surface of said wall at said area, said slots in said lower body portion respectively registering with said passages and cooperating therewith to accommodate the flow of fluid to said drain opening, all components of said nut being positioned entirely above the elevation of said area, and a closure plug including a body part extending through said drain opening into the central opening of said nut body part and in threaded engagement with said continuous end portion, said plug having a flange extending radially from the said body thereof and abutting the outer surface of said wall at said area.

2. The construction as defined in claim 1, wherein the plug radial flange has a flat face at the outer periphery thereof abutting the external surface of said wall, said flange being of arcuate cross section intermediate said flat face and said body part and having its concave side facing said wall, and a seal between said concave face and said wall.

LOUIS T. KNOCKE.

REFERENCES CITED

The following references are of record in the file of this patent:

UNITED STATES PATENTS

| Number | Name | Date |
|---|---|---|
| 951,437 | Gehrke | Mar. 8, 1910 |
| 1,459,903 | Behringer | June 26, 1923 |
| 1,526,375 | Riegel | Feb. 17, 1925 |
| 1,565,378 | Long | Dec. 15, 1925 |
| 1,591,184 | Reynolds | July 6, 1926 |
| 1,630,761 | Prime | May 31, 1927 |
| 2,299,183 | Shanor | Oct. 20, 1942 |
| 2,417,703 | Risk | Mar. 18, 1947 |
| 2,471,716 | Bell | May 31, 1949 |